(12) United States Patent
Riehl et al.

(10) Patent No.: US 8,776,013 B2
(45) Date of Patent: Jul. 8, 2014

(54) FLOW-OPTIMIZATION SYSTEM AND METHOD FOR CLOUD COMPUTING

(75) Inventors: Jon Riehl, Austin, TX (US);
Christopher R. Cope, North Potomac, MD (US)

(73) Assignee: Resilient Science, Inc., Bethesda, MD (US)

( * ) Notice: Subject to any disclaimer, the term of this patent is extended or adjusted under 35 U.S.C. 154(b) by 97 days.

(21) Appl. No.: 13/293,647

(22) Filed: Nov. 10, 2011

(65) Prior Publication Data

US 2013/0086549 A1 Apr. 4, 2013

Related U.S. Application Data

(60) Provisional application No. 61/542,509, filed on Oct. 3, 2011.

(51) Int. Cl.
*G06F 9/44* (2006.01)
*G06F 9/45* (2006.01)

(52) U.S. Cl.
USPC ............ 717/108; 717/118; 717/140; 717/146

(58) Field of Classification Search
None
See application file for complete search history.

(56) References Cited

U.S. PATENT DOCUMENTS

| | | | | |
|---|---|---|---|---|
| 5,590,332 | A * | 12/1996 | Baker | 717/151 |
| 7,941,460 | B2 * | 5/2011 | Bar-Or et al. | 707/803 |
| 8,060,868 | B2 * | 11/2011 | Meijer et al. | 717/141 |
| 2007/0192768 | A1 * | 8/2007 | Fables et al. | 719/313 |
| 2011/0179176 | A1 * | 7/2011 | Ravichandran et al. | 709/226 |
| 2012/0084315 | A1 * | 4/2012 | Schneider et al. | 707/769 |
| 2012/0311546 | A1 * | 12/2012 | Fanning et al. | 717/136 |
| 2013/0080480 | A1 * | 3/2013 | Mao et al. | 707/803 |
| 2013/0086261 | A1 * | 4/2013 | Lim | 709/224 |

OTHER PUBLICATIONS

Mehadevan R, Writing compilers using Python, Sep. 2010, at http://in.pycon.org/2010/static/files/talks/32/llvm-py.pdf.*
Changwoo Min, Autovectorization in LLVM, Jun. 23, 2010, at http://www.slideshare.net/multics69/autovectorization-in-llvm-5459401.*
Paul Morrison, Flow-Based Programming, 2nd Edison, at http://www.amazon.com/Flow-Based-Programming-2nd-Edition-Application/dp/1451542321.*
Thomas Lee, Python Compiler Internals, 2008, at http://www.slideshare.net/thomaslee/python-compiler-internals-presentation-slides-presentation.*
J. Paul Morrison, Book Titled Flow-Based Programming, 2nd Edition, 2009.*
Thomas Lee (NPL) Publication at http://www.slideshare.netithomasleeigython-comQiier-internals-Qresentation-slidespresentation, 2008.*
Changwoo Min (NPL) published at http://www.slideshare.net/multics69/autovectorization-in-llvm-5459401, 2010.*
Mahadevan R, (NPL) published at http://in.pycon.org/2010/talks/32-llvm-py-writing- compilers-using-python, 2010.*

* cited by examiner

*Primary Examiner* — Isaac Tecklu
*Assistant Examiner* — Hossain Morshed
(74) *Attorney, Agent, or Firm* — Bacon & Thomas, PLLC

(57) ABSTRACT

A cloud computing interface includes a high-level compiler uses a modified flow language referred-to as "Resilient Optimizing Flow Language" (ROFL) that converts inputs relating to source program and data definitions to generate bytecode objects that can be used by an execution engine to allocate input data to "processes" created by the execution engine based on available resources, so as to evaluate or perform particular tasks on the input data.

14 Claims, 2 Drawing Sheets

FLOW-OPTIMIZATION SYSTEM AND METHOD FOR CLOUD COMPUTING

This application claims the benefit of U.S. Provisional Patent Appl. Ser. No. 61/542,509, filed Oct. 3, 2011.

BACKGROUND OF THE INVENTION

1. Field of the Invention

This invention relates to "flow-based programming," and in particular to application of flow-based programming techniques to the field of "cloud computing." In flow-based programming, applications are defined as networks of black box processes which exchange data across predefined one-way connections, the black box processes being reconnected to form the different applications without having to be changed internally.

According to the invention, a high-level compiler uses a modified flow language referred-to as "Resilient Optimizing Flow Language" (ROFL) that converts inputs relating to source program and data definitions to generate bytecode objects that can be used by an execution engine to allocate input data to "processes" that are created by the execution engine based on available resources, so as to evaluate or perform particular tasks on the input data.

The flow-based system and method of the invention allows a service-provider to configure and update an interface between users of the service and distributed resources on the Internet that perform the service in a more natural and intuitive manner, without worrying about the precise timing of events. The invention thus provides a way to facilitate implementation of cloud computing applications by shifting emphasis from sequence of steps to transformations performed on streams of data.

2. Description of Related Art

The term "cloud computing" refers to the general concept of enabling a user to utilize software that runs on remote computing or processing devices, often referred to as "resources," connected to the user by the Internet, without knowledge on the part of the user of the nature or location of the devices on which the software is executed. The user accesses the "cloud," i.e., utilizes the software, through a website that enables the user to select the software and input data or commands. The data and commands input by the user are transferred-to the remote computing or processing devices through the interface, and results transmitted back to the consumer.

In order to most efficiently carry out the required services or computations, tasks performed by the user-selected software are allocated to multiple computing devices or processors according to predetermined resource-allocating formulas or calculations. The process of allocating the tasks to the computing devices or processors so as to perform the requested services or computations most efficiently is known as "flow optimization."

The present invention utilizes a technique known as flow-based programming to optimize flow and simplify implementation of the cloud computing applications. Instead of conventional interface software that defines a precise sequence of actions to be performed by the various components of the interface, the flow-based approach shifts the emphasis to vector transformations performed on steams of data.

The concept of flow-based programming is not new. In fact, flow-based programming technology dates back to the 1960's, and has been used by the banking industry for off-line applications since at least the mid-1970's, as described in the J. Paul Morrison's book entitled *Flow-Based Programming: A New Approach to Application Development*, van Nostrand Reinhold, 1994. Since then, a number of programming languages have been developed to implement flow-based programming techniques in various contexts involving the allocation of processing tasks to multiple processors.

One of the ways that the present invention departs from conventional flow-based programming implementations is in its application to a network or "cloud computing" environment, accomplished by utilizing a simplified flow-based programming language developed by the inventors and referred-to herein as ROFL ("Resilient Optimizing Flow Language"), which is based on or piggybacks on the existing language known as Python but which has the following distinguishing characteristics:

Purely Equational
    Users only have to write their equations, and don't have to worry about the plumbing at the language level. ROFL piggybacks on Python's expression syntax, so the learning curve isn't too severe for programmers used to C-like expression syntax.

Purely Functional
    ROFL code is purely functional. This means there are many opportunities to optimize and parallelize code since there is no need to worry about side effects when doing code motion. Generated code will run much faster than naked Python.

Safety
    The language focuses on data programming, not systems programming. The corresponding risk of code injection and other attacks is greatly reduced. By default, no systems commands are available, nor is an interpreter recursively callable from the surface language (Python constructs like eval and exec are not present).

Non-recursive
    Both the user and service provider can rest assured that their job will not run indefinitely because of unbound recursion. No recursion is permitted at the function definition level, and all looping constructs are bounded.
    This also makes job runtime estimation easier (though still not perfect in the presence of discontinuous functions), since we can profile a single evaluation of the function and scale that to the computed domain size.

Other Applications
    With systems commands enabled (see Safety, above) ROFL can provide a task-level parallelism language (kind of like UNIX pipes, but more expressive). The overall directed acyclic graph (DAG) structure of ROFL affords many other opportunities for defining complicated job flows, etc.

Currently, cloud computing interfaces must be custom designed by a skilled programmer, based on software and data definitions provided by the service provider. The present invention is intended to facilitate the setup of such "cloud computing" interfaces so that they can be programmed by directly inputting software specifications and data source definitions using the simplified ROFL language, without the need for specialized programming skills. ROFL is similar to a language known as SISAL (Streams and Iteration in a Single Assignment Language) and similar assignment-based languages currently used to facilitate the allocation of tasks or portions of tasks between different processing resources. In contrast to a more general programming language such as PASCAL or FORTRAN, parallel programming languages have improved array handling capabilities, a large library of functions adapted for allocation of processing resources, and so forth.

While the present invention is not necessarily limited to use of a particular parallel-processing adapted language, a preferred embodiment of the invention makes use of tokenizers, parsers, and other processing or configuration elements written in the Python language. Nevertheless, although the generation of vectors is described as involving a "Python"-based compiler, those skilled in the art will appreciate that some or all of the steps involved in compilation and vector generation may be carried out using programming languages other than Python. Further, it will be appreciated that while the present invention uses certain specific programming and flow optimization techniques that are generally known in the computing arts, the present invention is intended only to cover the particular application of those techniques to a particular cloud computing interface programming method and system, and not to cover the known programming and flow optimization techniques per se.

Ultimately, the invention seeks to simplify configuration of the cloud computing interface, so that the service provider may more easily adapt the interface to the requirements of different software or services, data sources, and processing resources, without the need for difficult programming. As such, it is not to be limited to a particular type of service or software, data source definitions, and so forth, or to particular arrangements of distributed resources arranged to perform the services or software to be offered by the service provider to the user through the interface.

SUMMARY OF THE INVENTION

It is accordingly a first objective of the invention to provide a method and system that enables a service provider to more easily configure or update a cloud computing interface than is possible with conventional programming techniques, while maintaining optimized flow.

It is a second objective of the invention to apply flow based programming techniques to a cloud computing type interface or environment.

It is a third objective of the invention to provide a method and system that uses flow based programming to enable update of a cloud computing interface to accommodate changes in the tasks/services offered through the interface, to resources that may be utilized by the tasks/services, or to the types/definitions of data that may be transmitted through the interface.

It is a fourth objective of the invention to enable a service-provider to program or update a cloud computing interface while achieving optimized flow solely by inputting the tasks/services to be performed (i.e., a source program(s)) and a data source for each required user input, thereby eliminating the need for knowledge on the part of the service provider of a particular shared-resource programming language (such as Python).

These objectives are achieved, in accordance with the principles of a preferred embodiment of the invention, by a system for implementing the method of the invention that includes:
  a. an input device for enabling a service provider to input a source program and data definitions utilizing the inventors' simplified flow based programming language known as ROFL;
  b. a compiler, which includes a Python tokenizer, parser, and transformer for transforming the service provider input into bytecode objects that can be converted into vectors; and
  c. an execution engine including a vectorizer arranged to receive programming objects from the compiler and transform the objects into a set of flow control vectors that allocate data from an external data adapter specification, and a plurality of internal inputs to "processes" that perform the tasks that make up the service or application, the execution engine further including:
    c1. internal data inputs 1 to N and an external data adapter specification;
    c2. the processes to which the data is allocated, which are established by the vectorizer based on the tasks to be performed and the available resources and are referred to as "program instances" 1 to M;
    c3. a program instance results block; and
    c4. a summarizer that collects and outputs the program instance results.

The bytecode objects generated by the compiler and used by the vectorizer to control data flow in the execution engine are, in a preferred embodiment of the invention, a set of SymPy objects that model the abstract syntax of the expression. The principle goal of the abstract syntax is to provide a representation of the user program in the ROFL implementation, for use by the vectorizer of the execution engine to allocate data to program instance blocks according to the requirements of the user program.

As an intermediate step during transformation into bytecode, the compiler performs normalization to further refine the output of the transformer into a format that is faster and more amenable to code generation. In a preferred embodiment, the normal function of the compiler performs lambda-lifting and common sub-expression elimination. The code generator then takes the normalized intermediate representation and generates Python source code, assuming that all lambda terms are bound at the top-level, and defining a Python function for each lambda term.

Although the above-described compiler is preferably combined with the execution engine to enable evaluation of large data sets, it should be appreciated that the compiler is itself sufficient to evaluate a "ROFL" program. Once the compiler generates the code, it is possible for the user to simply load the code and call into the program as a Python function. However, using the compiler in this capacity ignores its utility as both a safer language for use on the web, and its ability, when combined with the execution engine, to perform massively parallel computations across a distributed system.

One feature that makes ROFL a good candidate for use in defining parallel codes is its use of a purely functional abstract syntax. This allows a large degree of flexibility with ROFL programs, since they may be radically transformed and optimized. The ROFL implementation makes good use of these properties, applying well known optimization techniques such as common sub-expression elimination, and partial evaluation.

The objectives of the invention are also achieved, in accordance with the principles of a preferred embodiment, by a method of enabling a service provider to configure or update a cloud computing interface, so as to offer a flow-optimized cloud-computing service or source program to users, including the following steps:
  a. Using an optimizing flow language referred to herein as "Resilient Optimizing Flow Language" (ROFL), the service provider inputs a source program and, for each input to the program, defines a data source;

b. A compiler tokenizes, parses, and normalizes the service-provider input to generate bytecode that corresponds to the source program in the ROFL language;
c. The bytecode is input to an execution engine that represents tasks to be performed by available processing resources as processes or program instances;
d. The execution engine uses a vectorizer sub-component to control the flow of data from external and internal inputs to the various "processes" that executed the source program;
e. The processing resources are sorted and collated in a form that can be read by either a machine or the user.

In a preferred embodiment of the invention, the source program assignments and data source definitions are compiled into bytecode by the compiler utilizing "Python" tokenization and parsing techniques to obtain parse trees transformable into objects that model the abstract syntax of the expression. Those skilled in the art will appreciate that tokenization, parsing, and transformation are all well-known compilation techniques, and that it is within the scope of the invention to use a compiler that is based on a language other than Python. In addition, the resulting objects may optionally be optimized by a variety of known techniques, including but not limited to, lambda lifting or another appropriate conventional closure conversion technique, followed by common sub-expression elimination, to obtain an intermediate representation for compilation into Python bytecode.

The present invention is not intended to be limited to any programming language per se, but only to use of an appropriate programming language in connection with the preferred cloud computing method and system, and that any programming language that permits user input of a source program and data source definitions for subsequent compilation and execution on a cloud computing interface having a vectorizer that controls allocation of processing resources for enabling processing of data from the defined data sources by execution of the source program using the optimal arrangements of the processing resources.

In addition to the above-listed method steps, the preferred method may include the additional steps of the user requesting a cost estimate after inputting the source program and data source definitions, the system computing a worst case performance, and the system providing the user with an estimate of the cost of running the source program so that the user can decide whether to proceed with programming of the interface based on their budget.

DETAILED DESCRIPTION OF THE PREFERRED EMBODIMENTS

Figure 1:
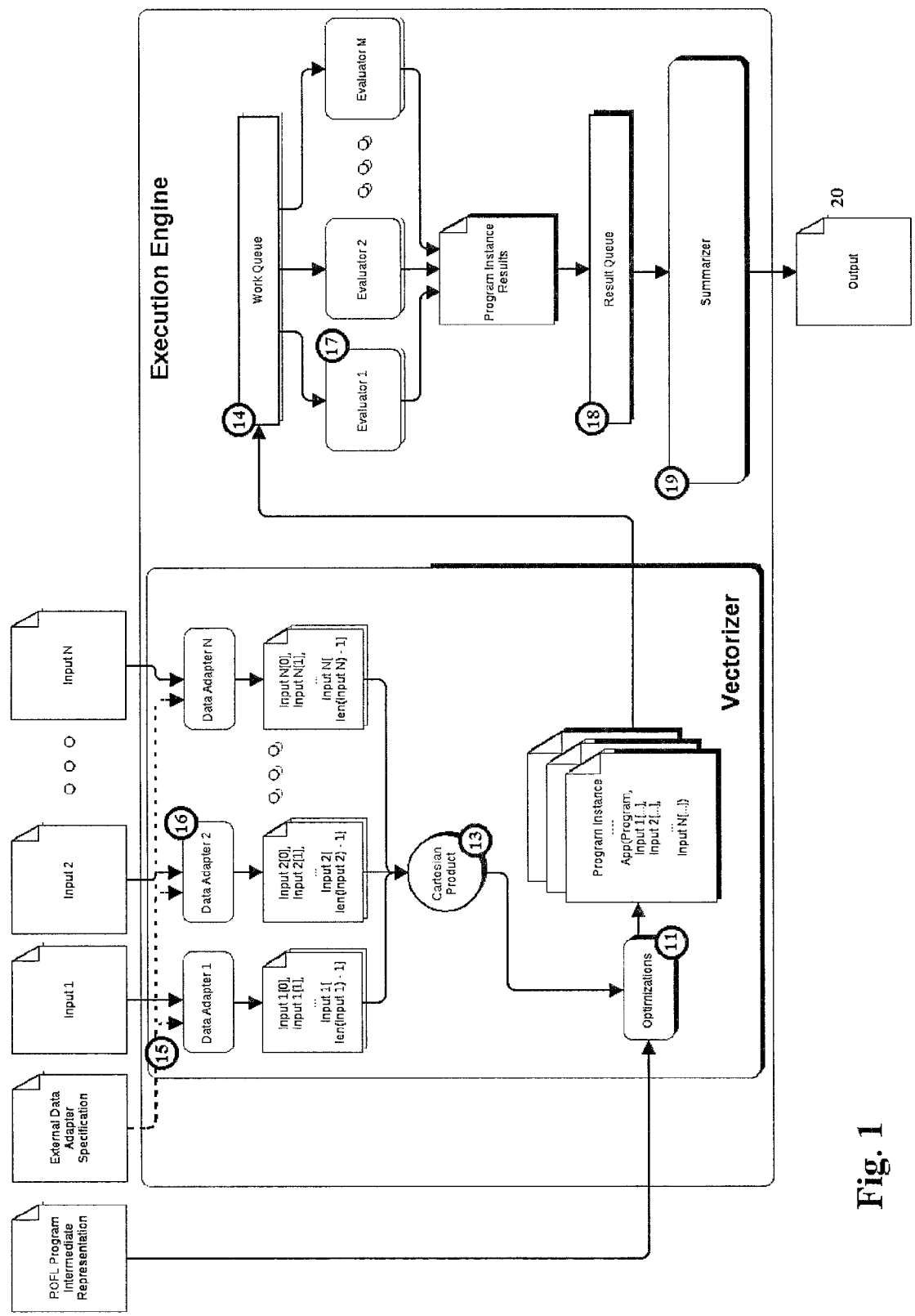
FIG. 1 is a functional block diagram illustrating a system for enabling programming or updating of a cloud computing interface while achieving optimized flow solely by inputting the tasks/services to be performed, i.e., a source program(s), and a data source for each required user input.

The system of the invention is illustrated in FIG. 1. Block 10, labeled "ROFL program," indicates a programming interface, including hardware and software, through which a programmer inputs application source code and input data source assignments or definitions. According to a preferred embodiment of the invention, the programmer inputs are supplied to a compiler 11, the compiler 11 including a Python tokenizer, parser, and transformer for transforming the service provider input into bytecode objects 12 that can be converted into vectors. The bytecode objects of the preferred embodiment are a set of SymPy objects that model the abstract syntax of the expression. The principal goal of the abstract syntax is to provide a representation of the user program in the ROFL implementation.

The programming objects generated by compiler 11 are input to a vectorizer 13 of execution engine 14. Vectorizer 13 uses the objects to control the flow of external data input 15 and external data inputs 16(1) to 16(N) to available processing resources in order to perform individual tasks, represented by the vectorizer 13 as processes or Program Instance blocks 17(1) to 17(M) that make up the service(s) or application(s). The results of the processes represented by the individual Program Instance blocks are then supplied by output block 18 to a summarizer 19, which then presents the results to a user of the service or application as an output 20 of the execution engine 14.

Compiler 11 is preferably made up of a Python tokenizer, a custom LL(1) parser, and a transformer. The lexical and syntactic conventions used by the parser function or module of compiler 11, which are referred to herein by the acronym ROFL, are described below. It will be appreciated by those skilled in the art that these conventions are a modified version of SISAL, and that further implementation details may be found in the following resources, which are incorporated herein by reference:

> http://sisal.sourceforge.net/
> LLNL User Manual - http://www2.cmp.uea.ac.uk/~jrwg/Sisal/00.Contents.html
> CACM Article - http://www.llnl.gov/tid/lof/documents/pdf/217941.pdf.

The parser component accepts a string of user source code as input, and outputs a concrete parse tree. The concrete parse tree represents all non-terminals in the grammar as nodes in the tree:

> node:=(payload,[node_0,node_1, ... ])

The payload element corresponds to either a lexical token, in which case the node has no children, or a non-terminal in the grammar.

The lexical conventions of the "ROFL" programming language used by the parser to parse inputs from ROFL programming block 10 follow those of the Python programming language, including the indention sensitivity to leading whitespace following new lines. These are defined in section 2 of the Python 2.3.5 Reference Manual, also incorporated by reference herein, and available at http://www.python.org/

> Python 2.3.5 Language Description: http://docs.python.org/release/2.3.5/ref/ref.html
> Python Abstract Syntax: http://docs.python.org/library/ast.html Python defines several keywords that are used in the context of statement syntax. Many of these keywords are not reserved in ROFL. ROFL defines the following as reserved keywords:

and
else
for
if
in
is
not
or
where

The "where" keyword is unique to ROFL, and the "else" keyword is reserved, but not currently used by the reference parser.

The language's syntactic conventions primarily follow those of the Python programming language's expression syntax, defined in section 5 of the Python 2.3.5 Reference Manual, incorporated by reference herein. In the definition grammar, defined below, Python expressions are abstracted as the "pyexpr" non-terminal symbol. The "pyexpr" currently points to the "testlist" non-terminal of the Python 2.3.5 grammar, and the expression list production in section 5.12 of the Python 2.3.5 Reference Manual. ROFL elides the "lambda" expression form, defined in sections 5.10 and 5.11 of the Python 2.3.5. Reference Manual. ROFL does not support anonymous functions.

ROFL statement syntax is defined by the following set of extended BNF (Bachus-Naur Form) productions, following the conventions of section 1.1 and the beginning of section 5 of the Python 2.3.5 Reference Manual:

| | |
|---|---|
| start | ::= (NEWLINE \| defn)* ENDMARKER |
| defn | ::= defn_lhs (augassign \| '=') pyexpr NEWLINE [where_clause] |
| where_clause | ::= 'where' ':' defns |
| defns | ::= defn \| NEWLINE INDENT (NEWLINE \| defn)* DEDENT |
| defn_lhs | ::= NAME [ '(' [ NAME (',' NAME)* ] ')' \| (',' NAME)+ ] |

Those skilled in the art will appreciate that the ROFL program syntax described above is essentially a set of definitions. A user writes a definition using an equality statement. The equality statement consists of a left-hand side, an equality operator, and a right-hand Python expression. Definitions may be followed by an optional "where" clause that allows the user to provide additional definitions. The lexical scope of these nested definitions extend only to any following nested definitions, and the parent right-hand expression. Recursive definitions are not permitted, though names may be rebound to different values.

A definition consisting of a single identifier ("NAME"), indicates the intention of binding of a name to a computed value in the parent lexical scope. A definition consisting of a set of comma-separated identifiers, indicates the intention of binding a set of names to a set of values held in a tuple, an immutable vector of values. In this case, a run-time error occurs if evaluation of the right-hand expression yields a tuple of the wrong size, or a value that is not a tuple.

A definition consisting of a name followed by a open parenthesis, an optional list of parameter names, and a close parenthesis denotes a function definition. In this case, ROFL binds the initial name to a function parameterized over the possibly empty vector of names given between the parentheses. Unlike Python, ROFL does not presently give users the option of providing optional values for parameters, nor using variable arguments, nor keyword arguments. The top-level entry point of a ROFL program is the last function definition present in the user source code. If no functions are present in the user source code, the ROFL implementation should signal an error.

The transformer component of compiler 11 walks the concrete parse tree and generates a set of SymPy objects that model the abstract syntax of the expression. The principle goal of the abstract syntax is to provide a representation of the user program in the ROFL implementation. The language's abstract syntax is essentially the untyped Lambda calculus (see references, below), extended with a Let form. Subsequent abstract syntax notation follows the "Constructor (argument_0, argument_1, . . . )" form for denoting function application, as opposed to the LISP/Scheme syntax which uses an infix notation such as "(Constructor argument_0 argument_1 . . . )". The language's abstract syntax does include an explicit function call constructor, App, which is short for apply. The implementation uses the App term to denote the difference between the compile-time construction of a term, where App is not used, and the run-time application of a function, where App is used.

The following term constructors are present in the "ROFL" abstract syntax of the preferred embodiment:

Add—Add all sub-terms.
And—Logical "and" of all sub-terms.
App—Call the first sub-term, using all remaining terms as arguments.
BitwiseAnd—Bit-wise (binary) "and" of all sub-terms.
BitwiseNot—Bit-wise (binary) "not" of all sub-terms.
BitwiseOr—Bit-wise (binary) "or" of all sub-terms.
BitwiseShiftLeft—Shift the binary representation of the first sub-term left by a number of bits, given in the second sub-term.
BitwiseShiftRight—Shift the binary representation of the first sub-term right by a number of bits, given in the second sub-term.
BitwiseXor—Bit-wise (binary) "xor" of all sub-terms.
GetAttr—Get the attribute specified by the second sub-term, which must be a symbol, from the result of evaluating the first. This allows interaction with Python objects, despite the lack of object constructors in ROFL.
If—If the first sub-term evaluates to a true value in Python, evaluate and simplify to the second sub-term, otherwise, evaluate to the third sub-term.
Lambda—Given a vector of parameter symbols in the first argument, abstract the second argument sub-term.
Let—Alternating sub-terms consisting of a symbol in the n-th position (odd, starting at the first position), a sub-term in the n+1-th position (even, starting at second position), and finished by a sub-term in the last position. See section on Normalization, below, for further semantics.
Mod—Integer modulus operator.
Mul—Multiply all sub-terms.
Not—Logical "not" of first sub-term.
Nth—Get a contained value in the first sub-term, which may be a Python list, tuple, or ROFL Tuple, indexed by the value of the second sub-term.
Or—Logical "or" of all sub-terms.
PartialApp—Given a function as the first sub-term, partially apply the remaining sub-terms as arguments to that function, resulting in a function with fewer parameters.
Pow—Exponentiation operator.
Symbol—A variable name, which is either bound to a Lambda parameter, a Let bound variable, or a Python function exposed by ROFL.

Tuple—Construct a Python tuple at run-time, using the result of evaluating each sub-term as an element in the resulting immutable vector.

The transformation process of compiler 11 takes a concrete parse tree, and constructs the corresponding abstract syntax tree. Most operators expand in a straightforward fashion. For example, the concrete parse tree for the expression "1+b", would be transformed into "Add(1, Symbol(b))". The more complicated forms are function definitions, and definitions for "where" clauses. The following illustrates the abstract syntax for a set of definitions that include both syntactic constructs:

$foo(x)=bar(x)+constant$ where:

$bar(y)=(y**2)+(54*y)$ constant=23

Given the concrete parse tree for the previous code, the transformer would output the following abstract syntax tree:

```
Let(Symbol(foo),
   Lambda((Symbol(x)),
     Let(Symbol(bar),
        Lambda((Symbol(y)), Add(Pow(Symbol(y), 2),
Mul(54, Symbol(y)))),
         Symbol(constant),
         23,
         Add(App(Symbol(bar), Symbol (x)),
Symbol(constant))
         )
      )
   Symbol(foo)
   )
```

Normalization further refines or grooms the output of the transformer into a format that is hypothetically faster, and more amenable to code generation. The normalization function performs lambda-lifting, pulling any nested function definitions into the top level and binding them to new symbols. The containing functions are extended to add the nested function as an additional parameter, and their names are rebound to partial applications of their lambda definitions. Lambda lifting techniques are described in

```
http://en.wikipedia.org/wiki/Lambda calculus
http://library.readscheme.org/,
``` incorporated herein by reference. The normalization function also desugars nested "let" forms, per the equivalences below, and then performs common sub-expression elimination, binding common sub-expressions to new symbols:
Let (x_0, e_0, x_1, e_1, . . . , x_n, e_n, exp)=App(Lambda (x_0,
Let (x_1, e_1, . . . , x_n, e_n, exp)), e_0)
Let (exp)=exp The code generator takes the normalized intermediate representation and generates Python source. The generator assumes that all Lambda terms are bound at the top-level, defining a Python function for each Lambda term. The generated code may be put into a Python module object, and run from Python. The program entry point is bound in the Python module to the "toplevel" attribute.

The ROFL language implementation described above is sufficient to evaluate a ROFL program. Once the compiler 11 generates Python code, it is possible for the user to simply load the generated code and call into the ROFL program as a Python function. However, using ROFL in this capacity ignores its utility as both a safer language for use on the web, and its ability to perform massively parallel computations across a distributed system. These capabilities are exploited by execution engine 14 which, when combined with the above-described compiler 11, enables evaluation of large data sets by using the ROFL execution engine.

The execution engine 14 accepts inputs, evaluates the inputs, and outputs a collection of program results for the user, as follows:
  Inputs
    Program code obtained from a ROFL compiler 11.
    Program inputs may come from two sources:
      Externally (globally) bound data adapters 15.
      Internally bound read-only data adapters 16(1) to 16(N).
    The execution engine 14 is responsible for reading external data, and converting the external data into a set of program inputs, creating a collection of input vectors.
  Execution (Evaluation of Inputs)
    For each input vector, the execution engine 14 queues a program instance 17(1) to 17(M) for evaluation by a distributed evaluator.
    An evaluator reads queued program instances, evaluates the program, and outputs a result.
  Output
    The execution engine appends the result of each program instance into an intermediate file, database, or queue to obtain program instance outputs(18).
    A summarization function or process (19) reads the results held by the intermediate container.
    The execution engine formats the result, and writes it to storage (such as a file, or a S3 object) using an output data adapter (20). The format of the output may include common data formats, such as JSON, XML, or text by way of a common pretty-printer.
    Example: s3://myoutputbucket/output.json.

The data adapter(s) 15 are specified by the following information:
  A binding name.
  A universal resource locator (URL).
  A data format descriptor (for example: JSON, XML, CSV, etc.)
  An optional slicing regimen. This follows Python and Scipy's slicing expression semantics, which can be respectively at http://python.org and http://www.scipy.org.

The data adapters can be externally or internally bound. In externally bound data adapters, the preceding information is given by a user to the execution engine via the execution engine's user interface (such as a web page, for example).

Internally bound data adapters appear as code inside the ROFL script, and are only a consideration for the execution engine in the sense that the engine must read the specified data at run time.

This design makes a key assumption about externally bound inputs. Namely, when the execution engine reads data from an externally bound input, that action does not cause one or more side-effects. In this context, side-effect free reads require the following invariants to hold over the course of a program run:
  Non-volatility: Repeated reads of an input will yield the same result.
  Order invariance: The order that inputs are read does not change any results.

Since the execution engine does not incorporate internally bound inputs as part of its execution strategy, these inputs are not required to abide by the above constraints. It is the user's responsibility to take this behavior into consideration, as use of internal data adapters can lead to duplicated work, and bandwidth limited computation.

Internally bound data adapters are expressed inside the ROFL language as function calls, which may be followed by an optional slicing expression. For example: binding=jsoninput('http://example.com/example.json')[2:9, 1, ... ].

The vectorizer 13 takes program inputs and attempts to divide their use between the computational resources available. A program's input is an input vector in the form of an immutable sequence of inputs targeted at a formal parameter of the top-level function, with each vector element consisting of either a single value, or a set of values. If more than one element in the vector is a set of values, the vectorizer expands the input into the Cartesian product of all input sets.

The following examples demonstrate steps the vectorizer 13 may take in building a set of program instances 17(1) to 17(M) for parallel evaluation. The examples follow the convention of using square brackets to indicate a list of program instances. Program instances are shown as ROFL abstract syntax, and contained by an App term. The first sub-term is the Lambda term corresponding to the top-level function of a ROFL program. The E sub-term in each Lambda represents the body of the top-level function. Remaining sub-terms are either sets of values, denoted by angle brackets ("<", ">"), or values, denoted by numbers. The vectorizer 13 issues the final list of App terms to a work queue, described in the following section.

The first example illustrates the expansion of all pair-wise set elements as the vectorizer 13 calculates the Cartesian product of two input vectors:
[App(Lambda((x, y), E), <1, 2, 3, ... >, <4, 5, 6, ... >)]
===>
[App(Lambda((x, y), E), 1, 4),
App(Lambda((x, y), E), 1, 5),
App(Lambda((x, y), E), 1, 6),
. . .
App(Lambda((x, y), E), 2, 4),
App(Lambda((x, y), E), 2, 5),
. . .
App(Lambda((x, y), E), 3, 5),
App(Lambda((x, y), E), 3, 6),
. . . ]

Since the size of a Cartesian product may be quite large, the vectorizer 13 may also slice an input vector into smaller vectors and use the Cartesian product of the slices. The evaluators are left to continue calculation of the element-wise Cartesian product. For example, given sets X, Y, and possibly others as input:
[App(Lambda((x, y, ... ), E), X, Y, ... )]
===>
[App(Lambda((x, y, ... ), E), X[:dX/2], Y[:dY/2], ... ),
App(Lambda((x, y, ... ), E), X[:dX/2], Y[dY/2:], ... ),
. . .
App(Lambda((x, y, ... ), E), X[dX/2:], Y[:dY/2], ... ),
App(Lambda((x, y, ... ), E), X[dX/2:], Y[dY/2:], ... ),
. . . ]

The previous example uses Python slices, where dX is the size of the X set, and dY is the size of the Y set. Each set is broken into two subsets of roughly half the size of the superset. The vectorizer 13 queues the Cartesian product of the subsets, not the set's individual contents.

A final property of the vectorizer 13 is the use of partial evaluation. In the cases where an input is a single value, and not a set, the vectorizer 13 may chose to simplify the code being evaluated by the execution engine 14. The vectorizer may also choose to do element-wise partial evaluation for small sets, based on the number of evaluators in use. The following example uses the notation "E[x=>5]" to denote the expression E, where any instances of the symbol x, are replaced by the value 5, except in cases where the name is re-bound in a nested binding form.
[App(Lambda((x, y, z, ... ), E), 1, <2, 3>, <4, 5, 6, ... >)]
===>
[App(Lambda((y, z, ... ), E[x=>1]), <2, 3>, <4, 5, 6, ... >)]
===>
[App(Lambda((z, ... ), E[x=>1] [y=>2]), <4, 5, 6, ... >),
App(Lambda((z, ... ), E[x=>1] [y=>3]), <4, 5, 6, ... >)]

The vectorizer may further simplify the issued expressions by doing constant folding, partially evaluating E after substitution of the new constant values.

The results of any function call or operator are obtained by evaluators, represented by program instance output block 18. The distributed execution environment is populated by a set of computing resources, which may be referred-to as "evaluators," and that are arranged to poll the vectorizer's work queue. When an evaluator 18 finds a new program instance 17(1) to 17(M) on the work queue, it marks the instance as being in progress. The evaluator then checks the program instance to see if the instance requires further expansion of inputs. If further expansion is necessary, the evaluator completes calculating the Cartesian product of input vectors. The evaluator reduces the program instance to Python code, and uses the Python virtual machine to evaluate the program. The evaluator outputs the program result, indexed by the vector of arguments, to a storage location managed by the summarizer 19. Once the summarizer 19 has the output, the evaluator 18 removes the program 17(1) to 17(M) instance from the work queue. If an evaluator fails to complete its calculations, a separate process will detect that the evaluator 18 has not finished within some threshold, and mark the program instance as available for evaluation by another worker.

The summarizer 19 takes outputs, indexed by the program instance argument vectors, and formats these into a multidimensional array. The multidimensional array has the same shape as a space of the Cartesian product of input vectors.

Those skilled in the art will appreciate that, in the above description, the term "input vector" may refer to an ordered set of values that appear as a single argument to a program, or the ordered set of program arguments.

Figure 2:
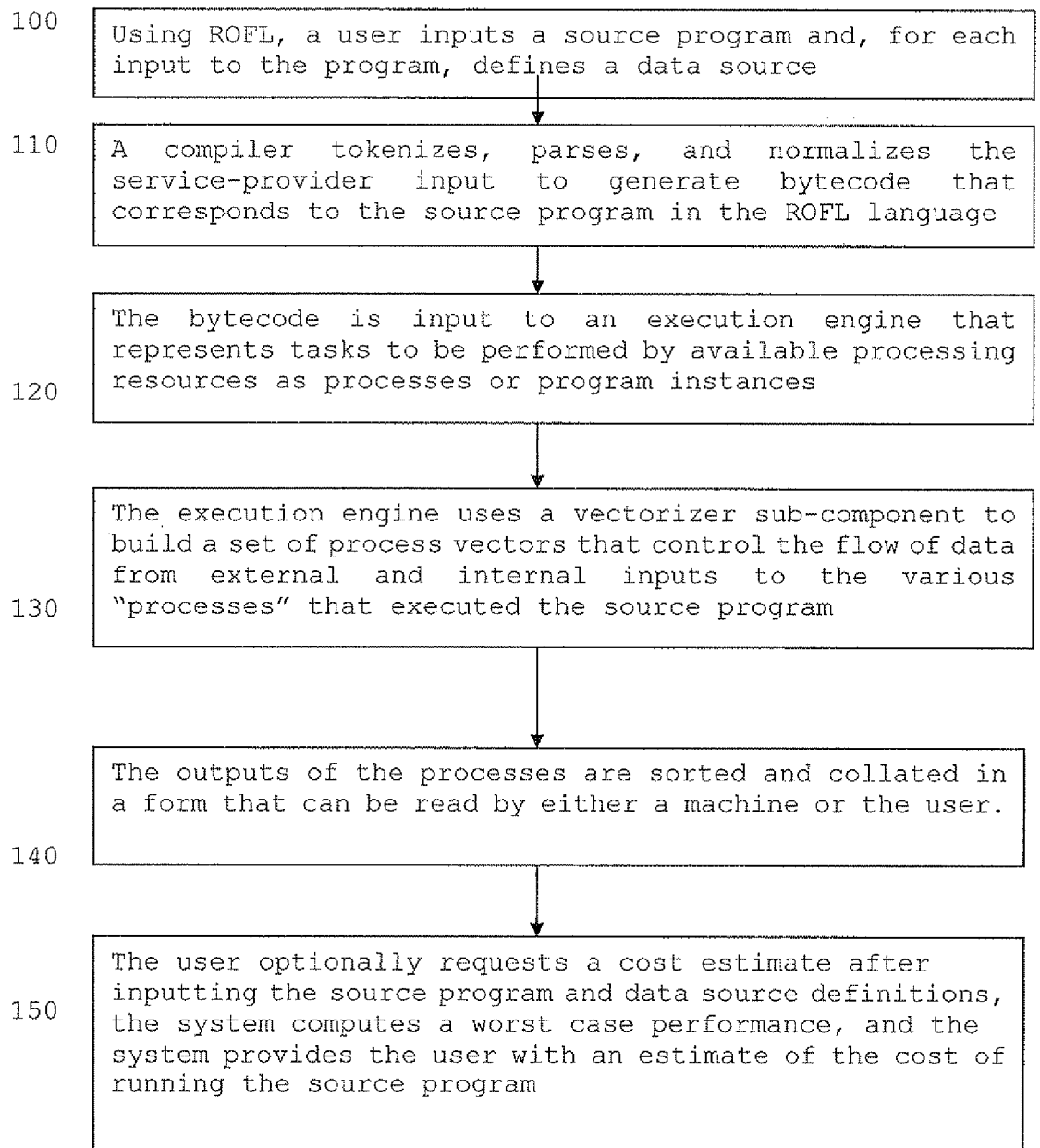
FIG. 2 is a flowchart illustrating a method of enabling programming or updating of a cloud computing interface while achieving optimized flow solely by inputting the tasks/services to be performed, i.e., a source program(s), and a data source for each required user input.

FIG. 2 illustrates a method by which a "user" may configure or update a cloud computing interface to enable the user to offer a service, in the form of one or more source programs executable on distributed computing resources, to achieve flow optimization.

The first step 100 of the method is for the user to input a source program, and for each input to the program, to define a data source, utilizing the above-described ROFL programming language. Second, in step 110, a compiler tokenizes, parses, and normalizes the service-provider input to generate bytecode that corresponds to the source program in the ROFL language. Step 110 involves the following four functions, which are described in more detail above in connection with compiler 11 shown in FIG. 1:

parse( )
  Input consists of the user program, represented as a string.
  Output consists of a concrete parse tree.

transform( )
　　Input is a concrete parse tree.
　　Output is an abstract syntax tree.
normalize( )
　　Input is an abstract syntax tree.
　　Output is a modified abstract syntax tree.
codegen( )
　　Input is an abstract syntax tree.
　　Output is Python code, either represented as a string, or a Python code object (described in section 3.2 of the Python 2.3.5 Reference Manual).

The third step of the preferred method, step 120, is to input the bytecode generated by the compiler to an execution engine that represents tasks to be performed by available processing resources as processes or program instances. Fourth, in step 130, the execution engine uses a vectorizer sub-component to control, based on the bytecode generated by the compiler, the flow of data from external and internal inputs to the various "processes" that executed the source program. Finally, in step 140, the processing resources are sorted and collated in a form that can be read by either a machine or the user.

In addition to the above-listed method steps, the preferred method may include the optional additional step 150 of the user requesting a cost estimate after inputting the source program and data source definitions, the system computing a worst case performance, and the system providing the user with an estimate of the cost of running the source program so that the user can decide whether to proceed with programming of the interface based on their budget.

Having thus described preferred embodiments of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

We claim:

1. A flow-programmable cloud computing interface connected to a computer network, the cloud computing interface enabling a user of a service or application provided by distributed computing devices or processors that are remote from the user to access the service or application through the computer network, comprising:
　　a. an input device including input device hardware and input device software for execution by the input device hardware for enabling a service provider to input a source program and data definitions utilizing a flow based programming language, said cloud computing interface further comprising programmed computing hardware that constitutes:
　　b. a compiler, including a tokenizer, parser, transformer, for transforming the service provider input into bytecode programming objects; and
　　c. an execution engine including a vectorizer arranged to receive said programming objects from the compiler and use the programming objects to generate input vectors that control allocation of data from an external data adapter specification and a plurality of internal inputs to "processes" that perform the tasks that make up the service or application, the execution engine further including:
　　　　c1. at least one internal data input and an external data adapter specification;
　　　　c2. program instances representing processes to which the data is allocated, which are established by the vectorizer based on the tasks to be performed and the available resources;
　　　　c3. program instance result outputs; and
　　　　c4. a summarizer that collects and outputs the program instance results.

2. A flow-programmable cloud computing interface as claimed in claim 1, wherein the compiler is a compiler written in Python.

3. A flow-programmable cloud computing interface as claimed in claim 1, wherein the compiler performs normalization to further refine the output of the transformer into a format that is faster and more amenable to code generation.

4. A flow-programmable cloud computing interface as claimed in claim 3, wherein the compiler performs lambda-lifting and common sub-expression elimination, and then takes the normalized intermediate representation and generates Python source code, assuming that all lambda terms are bound at the top-level, and defining a Python function for each lambda term.

5. A flow-programmable cloud computing interface as claimed in claim 1, wherein the bytecode programming objects are SymPy objects that model a purely functional abstract syntax of expression input by the service provider through the input device.

6. A method of enabling a service provider to configure or update a cloud computing interface, so as to offer a flow-optimized cloud-computing service or source program to users, including the following steps:
　　a. the service provider inputting a source program, and for each input to the source program, a data source definition;
　　b. a compiler generating bytecode;
　　c. the bytecode and input sources being input to an execution engine of the interface;
　　d. the execution engine using a vectorizer sub-component arranged to receive said bytecode from the compiler and use the bytecode to generate input vectors that control allocation of data from an external data adapter specification and a plurality of internal inputs to "processes" that perform the tasks that make up the service or application;
　　e. the processing resources being sorted and collated in a form that can be read by either a machine or the service provider to enable flow optimization when a user utilizes the service or source program.

7. A method as claimed in claim 6, wherein the compiler tokenizes and parses service provider inputs, transforms the tokenized and parsed inputs into bytecode objects, and supplies the bytecode objects to the vectorizer.

8. A method as claimed in claim 7, wherein the steps of tokenizing and parsing the service provider inputs are carried out by a Python tokenizer and a parser written in Python.

9. A method as claimed in claim 7, further comprising the steps of normalization by lambda-lifting and common sub-expression elimination.

10. A flow-programmable cloud computing interface as claimed in claim 7, wherein the bytecode programming objects are SymPy objects that model a purely functional abstract syntax of expression input by the service provider.

11. A compiler including computing hardware and software executed by the computing hardware for evaluating a flow-based programming language input through an input device that provides a hardware interface between a programmer and a flow-programmable cloud computing interface, the flow-programmable cloud computing interface including a connection to a computer network to enable users of services and distributed resources provided by remote computing devices or processors to access the services and processing resources through the computer network, the compiler comprising a tokenizer, parser, and transformer for transforming a service provider input into bytecode programming objects, wherein an execution engine using a vectorizer sub-component is arranged to receive said bytecode programming objects from the compiler and use the programming objects to generate input vectors that control allocation of data from an external data adapter specification and a plurality of internal inputs to "processes" that perform the tasks that make up the service or application, wherein the compiler is a compiler written in Python, and wherein the bytecode programming objects are objects that model a purely functional abstract syntax of expression input by the service provider through the input device.

12. A compiler as claimed in claim 11, wherein the compiler performs normalization to further refine the output of the transformer into a format that is faster and more amenable to code generation.

13. A compiler as claimed in claim 12, wherein the compiler performs lambda-lifting and common sub-expression elimination, and then takes the normalized intermediate representation and generates Python source code, assuming that all lambda terms are bound at the top-level, and defining a Python function for each lambda term.

14. A compiler as claimed in claim 12, wherein the compiler supplies the bytecode objects to an execution engine that includes a vectorizer arranged to receive said bytecode objects from the compiler and use the bytecode objects to allocate data from an external data adapter specification, and a plurality of internal inputs to "processes" that perform the tasks that make up the service or application, the execution engine further including:
- at least one internal data input and an external data adapter specification;
- program instances representing processes to which the data is allocated, which are established by the vectorizer based on the tasks to be performed and the available resources;
- program instance result outputs; and
- a summarizer that collects and outputs the program instance results.

* * * * *